United States Patent [19]

Birks et al.

[11] 4,016,456
[45] Apr. 5, 1977

[54] MULTIELECTRODE GRID FOR ALIGNING POLARIZED PARTICLES SUCH AS ASBESTOS

[75] Inventors: Laverne S. Birks, Potomac, Md.; Mohammad Fatemi, Mc Lean, Va.

[73] Assignee: The United States of America as represented by the Secretary of the Navy, Washington, D.C.

[22] Filed: Sept. 5, 1975

[21] Appl. No.: 610,729

[52] U.S. Cl. .............................. 361/288; 313/293; 313/306
[51] Int. Cl.² ........................................ H02N 13/00
[58] Field of Search ............ 317/3, 262 A, 262 AE, 317/262 F; 162/192, 153; 313/306, 293; 200/61.05

[56] References Cited

UNITED STATES PATENTS 2,735,907   2/1956   Inman .............................. 200/61.05

Primary Examiner—R. N. Envall, Jr.
Attorney, Agent, or Firm—R. S. Sciascia; Philip Schneider; Melvin L. Crane

[57] ABSTRACT

A multi-electrode grid for aligning polarized particles such as asbestos within a dielectric medium.

1 Claim, 3 Drawing Figures

MULTIELECTRODE GRID FOR ALIGNING POLARIZED PARTICLES SUCH AS ASBESTOS

CROSS REFERENCE TO RELATED APPLICATION

This application relates to Navy Case No. 58,317 Ser. No. 610,728 and Navy Case No. 58,318 Ser. No. 610,730 filed on even date herewith.

BACKGROUND OF THE INVENTION

This invention is directed to a method of forming a multielectrode grid for aligning polarized particles within a dielectric medium and more particularly to the grid structure so formed.

Heretofore asbestos fibers have been aligned by use of a pair of spaced electrodes such as set forth in U.S. Pat. No. 3,497,419. Such an arrangement is not satisfactory for asbestos samples because of the amount of small asbestos particles in the sample and because the outer most particles populate adjacent the electrodes with very little fiber in the center between the electrodes. It has been determined that the applied current may be D.C. or A.C., however the applied field must be from about 1000 to about 5000 volts/cm for proper alignment of the asbestos fibers.

SUMMARY OF THE INVENTION

In carrying out this invention, a plurality of parallel aligned electrodes are formed with alternating electrodes connected electrically to opposite poles.

DETAILED DESCRIPTION

Figure 1:
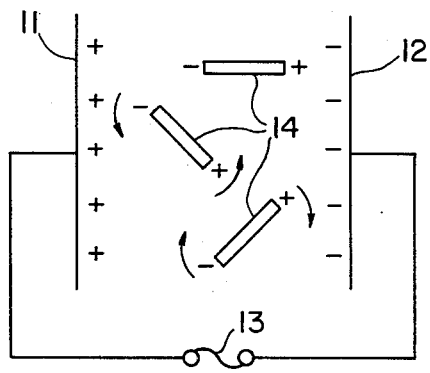
FIG. 1 illustrates the polarization of asbestos fibers in a dielectric medium during ½ cycle of an alternating current field or during D.C. alignment.
Figure 2:
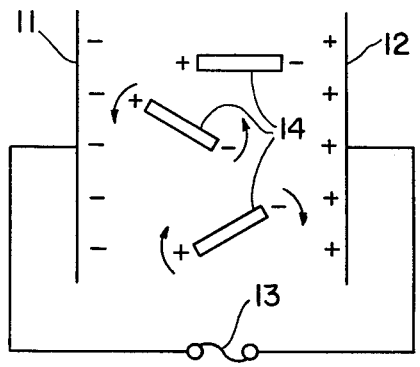
FIG. 2 illustrates reversal of the field of the electrodes of FIG. 1.

Now referring to the drawing, FIGS. 1 and 2 illustrate the use of spaced electrodes 11 and 12 secured to a voltage source 13 for producing a field between the electrodes. FIG. 1 illustrates asbestos fibers 14 in a dielectric medium aligned by either an alternating current source or a direct current source. The application of a field between the electrodes is seen to induce polarization charges on the fibers, which charges apply a torque thereby turning the fibers until they align themselves parallel with the field. FIG. 2 illustrates the plates of FIG. 1 with the field reversed as in the next half cycle of an alternating current source. That is FIGS. 1 and 2 illustrate a complete cycle of alternating current and the effect of the field on the asbestos fibers within a dielectric medium. It has been determined that the fibers will align themselves in a D.C. field or in an A.C. field because the polarization on the fibers change as the field is reversed. Reversal of the field causes a reversal of polarization and retains the direction of the induced torque on the fibers. The average net force on the fiber due to polarization is always zero and the torque is reduced to zero upon alignment of the fibers.

A single pair of electrodes as shown in FIGS. 1 and 2 causes the asbestos fibers to align themselves between the electrodes. The population of fibers is in general, larger adjacent the electrodes than in the center.

Figure 3:
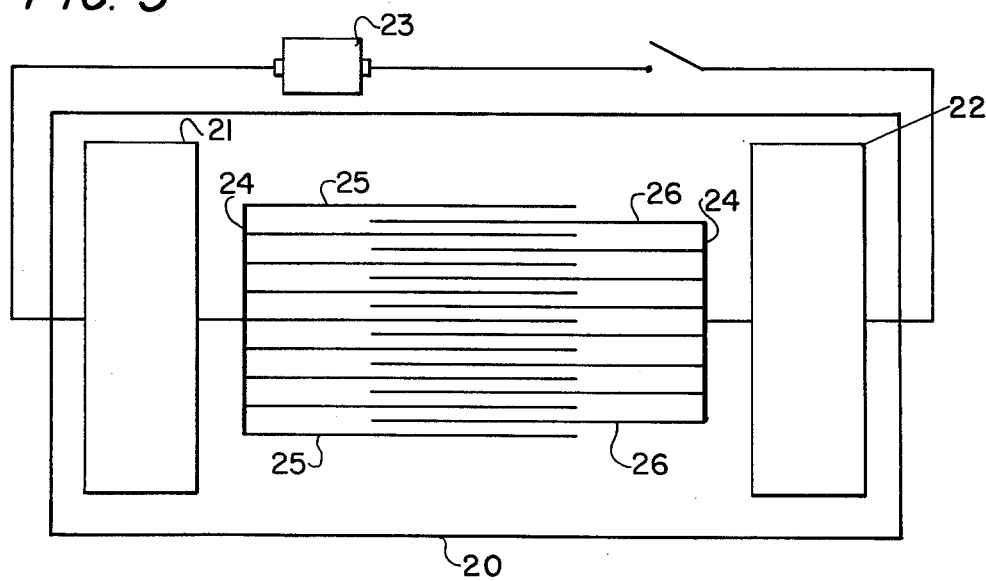
FIG. 3 illustrates the electrode assembly of this invention.

FIG. 3 illustrates the electrode structure of this invention. As shown, the structure comprises a quartz base or substrate 20 upon which is formed a pair of spaced electrodes 21 and 22 each of which are electrically connected to a voltage source 23 and to feed conductors 24. A plurality of spaced electrodes 25, 26 are secured at one end thereof to feed conductors 24, physically in parallel to each other with the electrodes from each feed conductor alternating with each other. The electrodes 25, 26 extend across the spacing between the feed conductors 24 but are of lesser strength so that their free ends adjacent the opposite feed conductor are spaced therefrom.

As shown, the feed conductors are larger than the parallel electrode elements for structural stability. The electrodes are interdigitated chromium lines 40–80 $\mu$m wide, with a thickness of 800–2000 Argstroms, with adjacent electrodes separated by about 0.8 mm.

Since it has previously been determined that a voltage source of about 3000 volts is necessary to align asbestos fibers between electrodes spaced 1 cm apart, the present electrode structure may be operated at 1/10 the above voltage. Therefore the present system is much safer than the previous devices.

The electrode structure of FIG. 3 is formed by a standard precedure well known in microelectronics which is as follows:

1. A "master" is prepared ten times as large as the desired product and photoreduced onto a quartz flat.
2. Quartz discs with a 1200-A layer of evaporated chromium are obtained either commercially or from a vacuum evaporation facility. Quartz is desirable because it cleans better than glass and vacuum deposition is more suitable than sputtering due to its more gentle treatment.
3. The chromium plated side of the discs are sprayed with photo-resist and baked at 300° F for about 15 minutes.
4. The "master" is placed in contact with the photo-resist and exposed to ultraviolet light for about 10 minutes.
5. The exposed disc is "developed" to remove the unexposed photoresist.
6. The exposed chromium is etched away.
7. The photoresist is dissolved and the grid is washed, dried, and inspected for continuity.

As an example of operation of the electrode assembly for formation of asbestos fiber samples the following method is used.

About 4 mg of UICC standard chrysotile asbestos fibers are placed in a wetting agent such as ½ ml of 1% Aerosol OT solution in water.

Aerosol OT is a trade name of Americal Cynamid Co., which is dioctyl sodium sulfosuccinate. (The Aerosol OT is necessary as a dispersing agent). The suspension is sonicated for about 45 minutes at 100 watts power using a "cell disrupter", for reducing the size of the fibers to 1–4 $\mu$m long with a 0.1 $\mu$m diameter. A suitable "cell disrupter" is a model No. 16–850 manufactured by the Virtis Co. The sonicated suspension is diluted with water to 500 ml making the asbestos concentration of 6 $\mu$ g/ml. A 25 ml aliquot of the diluted suspension (150 $\mu$ g of asbestos) is vacuum filtered onto a 25 mm diameter disk 0.45–0.80 $\mu$m pore size of filter membrane. Best results are obtained with membranes made of cellulose triacetate. Examples are millipore HAWP, AAWP and Gelman GA2 and GA6 membrane. The disk of millipore is folded, placed into a test tube and ashed for about 2½ hours in a low-temperature radio-frequency asher such as a Perkin-Elmer No. Coleman 40. Subsequent to ashing, 30 drops of 0.001% solution of parlodion (cellulose nitrate) is distilled amyl acetate is added to the ashed residue. The suspension is then sonicated for about 8 minutes to insure a homogeneous distribution of asbestos. One drop of the latter suspension containing about 5 $\mu$ g asbestos is placed onto the above described grid FIG. 3 and 240 volts alternating current is applied to the electrodes of the grid. The assembly is left undisturbed with the power applied until the droplet has completely dried. The power is then switched off and the electrodes are examined under an optical microscope for any unusual flaws in the sample.

Application of the power to the electrode of the grid causes the asbestos fibers to align themselves substantially parallel to each other and perpendicular to the grid wires. Therefore when the droplet has dried the asbestos fibers will remain aligned as set forth above.

A solution of 2.5% parlodion (cellulose nitrate) in amyl acetate is sprayed gently onto the dried sample to embed the fibers in a thin plastic film. The sprayed film is allowed to dry in a dust-free environment and subsequently stripped off the microelectrode assembly by dipping the grid into water in which the film with the aligned asbestos fibers attached floats to the surface of the water. The film is picked up by a ring-shaped holder making sure that the film is wrinkle free and centrally aligned on the ring-shaped holder. The film is premitted to dry and is ready for measurement of the asbestos fibers. It has been determined that a thin film minimizes the background intensity contributed by x-ray scattering from the film during measurement.

The sample is then placed in the x-ray analyser set forth in Navy Case No. 58,318 and signal measurements are made which include signal plus background as well as background. Samples containing different quantities of asbestos may be prepared and calibration curves for the different quantities may be made.

Once the asbestos calibration standard has been made from known amounts of asbestos, analysis of actual particulate collections for asbestos content may be made. The unknown sample preparation is not completely the same as for the calibration samples because the unknown samples contain particulate matter other than asbestos. However the use of the above described electrode assembly is the same.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A multi-electrode assembly for aligning polarizable particles in a dielectric medium parallel with each other and in parallel rows which comprises:
    a quartz base having a top surface;
    first and second spaced conductors on top of said base surface;
    a pair of spaced parallel-feed conductors on top of said base surface in parallel alignment with said first and second spaced conductors and electrically connected thereto; and
    a plurality of parallel interspaced chromium electrodes on top of said base surface secured at one end to alternately to one each of said pair of parallel-feed conductors perpendicular thereto with their non-connected ends spaced from said feed conductor to which they are not connected,
    said chromium electrodes having a width of substantially from 40–80 $\mu$m; a thickness of substantially from 800–2000 Angstroms and spacing between adjacent conductors of substantially 0.80 mm.

* * * * *